Sept. 3, 1968 — R. E. HEARD — 3,399,635
FREIGHT BRACING DEVICE
Filed March 21, 1966 — 2 Sheets-Sheet 1
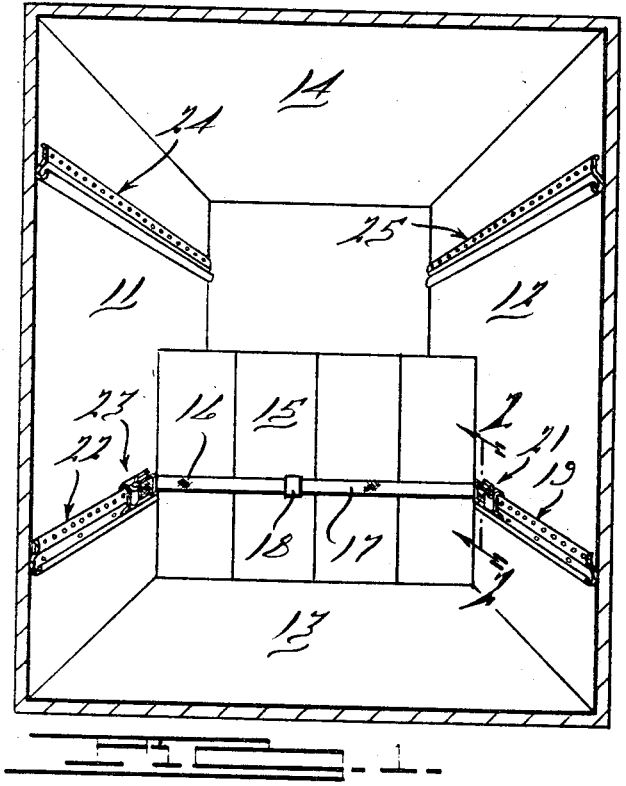
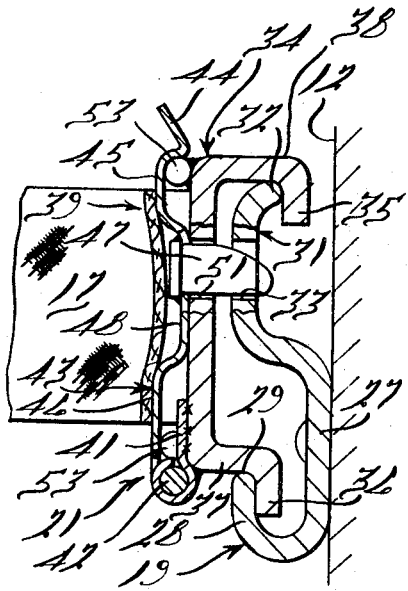
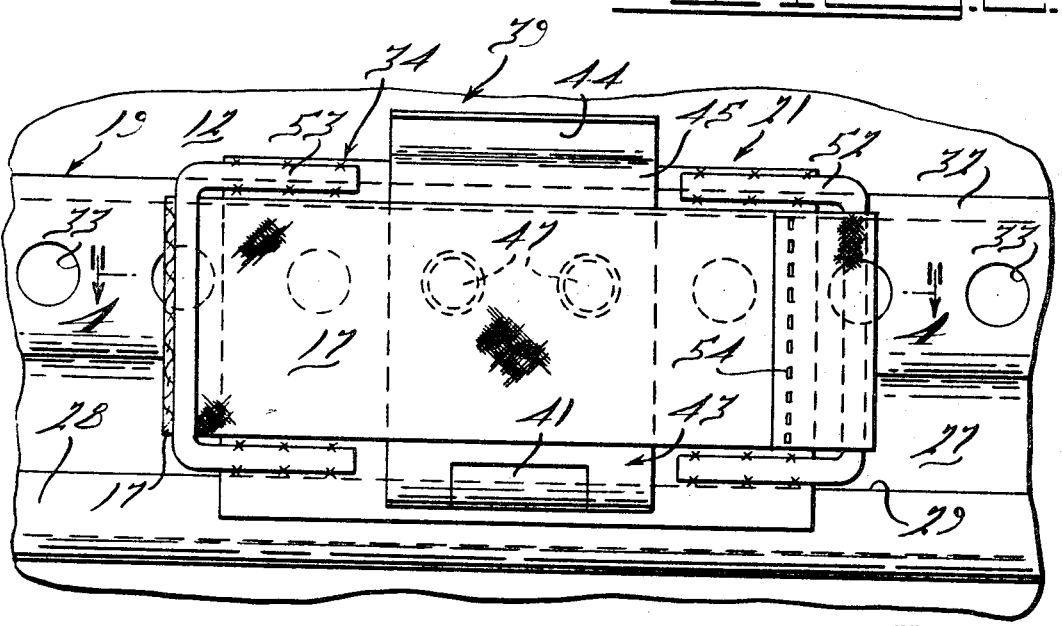
INVENTOR.
Robert E. Heard
BY Harness, Dickey & Pierce
ATTORNEYS.

Sept. 3, 1968 R. E. HEARD 3,399,635
FREIGHT BRACING DEVICE
Filed March 21, 1966 2 Sheets-Sheet 2
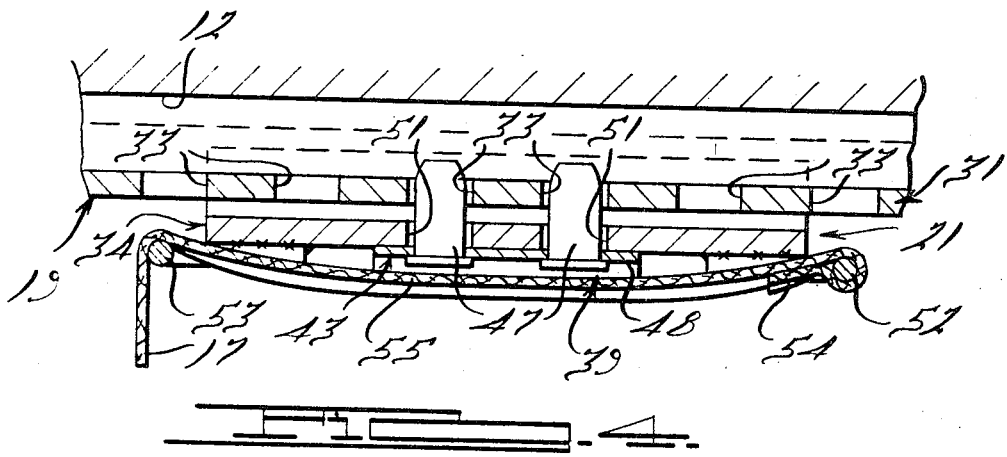
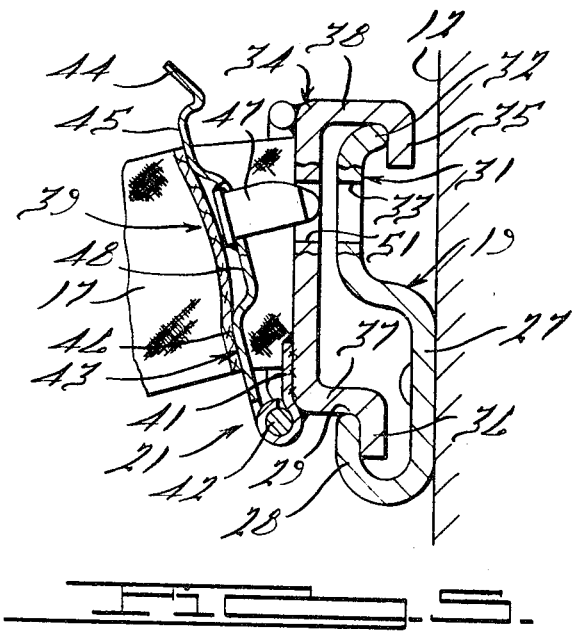
INVENTOR.
Robert E. Heard
BY
J Harness, Dickey & Pierce
ATTORNEYS

United States Patent Office 3,399,635
Patented Sept. 3, 1968

3,399,635
FREIGHT BRACING DEVICE
Robert E. Heard, Plymouth, Mich., assignor to Evans Products Company, a corporation of Delaware
Filed Mar. 21, 1966, Ser. No. 535,935
2 Claims. (Cl. 105—369)

ABSTRACT OF THE DISCLOSURE

A lading system including flexible straps and anchor fittings for retaining the straps in longitudinally adjusted positions within the cargo area. The anchor fittings are designed in such a way that the force of the load upon the strap holds the anchor fitting in its locked position.

---

This invention relates to a freight bracing device and more particularly to an improved anchor fitting for attaching a flexible freight bracing member in an adjusted position.

In one common form of freight bracing device that is particularly adapted for use in trucks or other highway freight transporting vehicles, a flexible strap member extends between opposite walls of the cargo area for engaging and bracing freight. Some mechanism is provided for attaching the ends of the strap to the opposite side walls of the cargo area so that its position along the length of the cargo area may be adjusted. The elongation of the flexible member under loads can sometimes cause the end attachments to work loose from their adjusted position thus permitting the load to shift.

It is, therefore, a principal object of this invention to provide an improved anchor member for fixing the end of a freight bracing device relative to a wall of a cargo area.

It is a further object of the invention to provide an improved anchor device for a flexible freight bracing member.

It is a yet further object of the invention to provide an anchor for a freight bracing member wherein the locking pressure upon the anchor is increased in response to loading upon the freight bracing member.

It is another object of the invention to provide an anchor for attaching a flexible freight bracing member to a wall of a cargo area wherein the pressure upon the anchor locking device increases in response to an increase in the tension upon the flexible member.

An anchor device embodying this invention is particularly adapted to retain a freight engaging member in position relative to a wall of the cargo area. The anchor device comprises means supporting it for adjusting movement relative to the wall and locking means for retaining it in an adjusted position relative to the wall. The anchor device further includes means responsive to the loading upon the freight engaging member for increasing the force holding the locking means in its engaged position.

Other objects and advantages of this invention will become more apparent as this description proceeds, particularly when considered in conjunction with the accompanying drawings, wherein:

FIGURE 1 is a perspective view of a cargo area embodying this invention;

FIGURE 2 is an enlarged cross-sectional view taken along the line 2—2 of FIGURE 1 showing the strap anchor fitting;

FIGURE 3 is a side elevational view of the anchor fitting shown in FIGURE 2;

FIGURE 4 is a cross-sectional view taken along the line 4—4 of FIGURE 3; and

FIGURE 5 is a cross-sectional view, in part similar to FIGURE 2, showing the anchor locking device in a released position.

Referring now in detail to the drawings and in particular to FIGURE 1, a cargo area is depicted as being defined at least partially by side walls 11 and 12, a floor 13 and a roof 14. The cargo area may be that of a freight transporting highway trailer, a railway car or any other similar freight transporting vehicle. In addition, the invention is susceptible of use in stationary cargo areas but has more utility in moving freight transporting vehicles wherein the loads are more likely to shift. A load, indicated generally by the reference numeral 15, is retained in position by means of a pair of straps 16 and 17 that are interconnected at one of their ends by means of a fastening device 18. The other end of the strap 17 is affixed to a belt rail 19 that is affixed to the side wall 12 by means of a strap anchor fitting, indicated generally by the reference numeral 21. In a like manner, the end of the strap 16 is affixed to a belt rail 22 that is secured to the side wall 11 by means of a strap anchor fitting, indicated generally by the reference numeral 23. Additional belt rails 24 and 25 may be affixed to the side walls 11 and 12, respectively, in the event that higher loads and additional strap securing means are to be used.

Referring now in detail to the remaining figures, each of the belt rails 19, 22, 24 and 25 is identical in construction as are the strap anchor fittings 21 and 23. Only one of these assemblies will, therefore, be described in detail. The belt rail 19 has a first generally straight section 27 that is affixed in any suitable manner to the side wall 12. The lower end of the section 27 is formed with a reversely folded part 28 that forms an upstanding flange 29. A straight section 31 is connected integrally to the upper end of the straight section 27 and is offset slightly outwardly from the side wall 12 and from section 27. The section 31 terminates in an inwardly bent flange 32. A plurality of circular apertures 33 are formed in the straight section 31 at spaced intervals along the length of the belt rail 19.

The strap anchor fitting 21 comprises a generally channel-shaped anchor member 34 having downwardly extending flanges 35 and 36 formed at the outer ends of its short legs 38 and 37. The lower short leg 37 is adapted to be supported upon the flange 29 of the belt rail 19 and the upper short leg 38 is adapted to be supported upon the belt rail flange 32 with the downwardly extending flanges 35 and 36 of the anchor member 34 being received behind the belt rail flanges 32 and 29, respectively. Thus, the anchor member 34 is slidably supported upon the belt rail 19 and precludes the movement of the anchor member 21 laterally away from the wall 12.

A latch mechanism, indicated generally by the reference numeral 39, is provided for affixing the strap anchor fitting 21 in an adjusted position upon the belt rail 19. The latch mechanism 39 is in the form of a hinge with a short leaf 41 that is affixed, as by welding, to the anchor member 34. A pivot pin 42 journals a longer leaf 43 of the latch mechanism 39 at the lower end of the anchor member 34. The long leaf 43 has an upstanding handle portion 44 and outwardly facing surfaces 45 and 46 for a purpose which will become more apparent as this description proceeds.

Two generally arcuate-shaped locking pins 47 are affixed to a depressed central part 48 formed between the surfaces 45 and 46. The locking pins 47 extend inwardly toward the belt rail 19 through circular apertures 51 formed in the anchor member 34. The spacing between the locking pins 47 and anchor member apertures 51 corresponds to the spacing of the circular apertures 33 of the belt rail 19.

A generally C-shaped rod member 52 is affixed at one end of the anchor member 34 by welding of its short legs to the anchor member 34. A like C-shaped rod member 53 is affixed in a similar manner to the opposite end of the anchor member 34. The webbing of the strap 17 is sewed onto or otherwise affixed to the C-shaped rod member 52, as at 54. The strap member 17 is guidingly engaged on the underside of the C-shaped member 53 (FIGURE 4) so that a portion 55 of the belt 17 will engage the outermost face of the locking strap surfaces 45 and 46.

The longitudnial position of the end fitting 21 on the belt rail 19 may be adjusted by pivoting the leaf 43 in a counter-clockwise direction about the pivot pin 42 to draw the belt portion 55 away from the anchor portion 34 (FIGURE 5) so that the locking pins 47 can be removed from the belt rail openings 33. The anchor member 34 then may be slid along the belt rail 19 until the desired freight bracing position is reached. Then, the belt 17 is affixed to the adjacent end of the belt 16 by means of the fastening device 18 and tension placed upon the belts 16 and 17 in any known manner. When the belt 17 is tensioned, the guide member 53 will force the belt portion 55 against the latch leaf 43 driving the locking pins 47 into the belt rail openings 33. It should be readily apparent that the greater the tension on the belt 17, the more locking pressure will be exerted upon the latch pins 47. In a like manner, any shifting of the load 15 will increase the tension upon the belt 17 and place further locking pressure upon the anchor fitting 21. Thus, the greater the forces tending to shift the load 15, the greater the locking pressure upon the anchor fittings.

While is will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:
1. An anchor device for attaching a flexible freight engaging strap in an adjusted position relative to a wall of a cargo area comprising anchor means adapted to be supported by the wall for longitudinal movement with respect thereto, a locking member supported by said anchor means for pivotal movement between a disengaged position and an engaged position with the wall for locking said anchor device in a fixed longitudinal position relative to the wall, attaching means carried by said anchor means on one side of said locking member for attaching one end of the flexible strap to said anchor means, and guiding means affixed to said anchor means on the other side of said locking member, the guiding means being effective to direct the flexible strap into engagement with said locking member as the flexible strap extends from said attaching means across said guiding means and into the cargo area for retaining said locking member in its engaged position in response to tensioning of the flexible strap.

2. An anchor device as set forth in claim 1, wherein the anchor member has a down-turned flange adapted to be guidingly engaged upon a belt rail or the like affixed to the cargo area wall, said locking member carrying at least one latch pin adapted to engage an aperture in the belt rail for locking said anchor device in position.

References Cited
UNITED STATES PATENTS

| | | | |
|---|---|---|---|
| 994,822 | 6/1911 | Daly | 105—369 |
| 2,602,690 | 7/1952 | Meighan | 105—369 XR |
| 2,655,874 | 10/1953 | Swann | 105—369 |
| 2,827,000 | 3/1958 | Tobin | 105—369 |
| 2,895,430 | 7/1959 | Dunlap | 105—369 |
| 3,173,645 | 3/1965 | Gray | 248—361 |

DRAYTON E. HOFFMAN, *Primary Examiner.*